US006050721A

United States Patent [19]

Rainey

[11] Patent Number: 6,050,721

[45] Date of Patent: Apr. 18, 2000

[54] MIXING MACHINE FOR PLASTICIZABLE COMPOUNDS

[76] Inventor: Thomas David Rainey, 163 N. Bellaire Ave., Louisville, Ky. 40206

[21] Appl. No.: 09/108,893

[22] Filed: Jul. 1, 1998

[51] Int. Cl.[7] .......... B29F 7/08

[52] U.S. Cl. .......... 366/321; 366/322

[58] Field of Search .......... 366/321, 322, 366/99, 88, 194

[56] References Cited

U.S. PATENT DOCUMENTS

| | | | |
|---|---|---|---|
| 1,001,508 | 8/1911 | Craig | 366/321 |
| 1,088,423 | 2/1914 | Hubbard . | |
| 1,461,936 | 7/1923 | Richards | 366/321 |
| 1,484,945 | 2/1924 | Hill . | |
| 1,977,515 | 10/1934 | Klippel . | |
| 3,203,631 | 8/1965 | Jutila | 366/194 |
| 3,358,970 | 12/1967 | Clancy et al. | 366/321 |
| 3,652,063 | 3/1972 | Lawson et al. | 366/321 |
| 3,901,483 | 8/1975 | Lasar | 366/321 |
| 3,924,841 | 12/1975 | Shinmoto | 366/321 |
| 4,187,030 | 2/1980 | Godley . | |
| 5,267,788 | 12/1993 | Rockstedt . | |
| 5,352,035 | 10/1994 | Macaulay et al. | 366/321 |

FOREIGN PATENT DOCUMENTS

| | | |
|---|---|---|
| 55-31476 | 8/1978 | Japan . |

*Primary Examiner*—Tony G. Soohoo
*Attorney, Agent, or Firm*—Middleton & Reutlinger; John F. Salazar

[57] ABSTRACT

The present invention is for a mixing machine for plasticizable compounds which attaches directly to a molding machine and which is used to color a base material with a color additive. The apparatus receives a base material and color additive for mixing and has a mixing chamber within which the compounds are mixed. The machine has a central impeller which drives a first and second helical flight one of which is right handed and the other is left handed. The material is folded over itself within the mixing chamber before depositing into a molding machine. The mixing chamber consists of a cylindrical housing which has a drive motor attached to one end wall, the other end wall being removable. The housing has a substantial portion of its lower wall remove to form an exit aperture into a downwardly extending funnel. The plasticizable material enters with the additive through the top portion of said housing, is mixed within said housing by said helical flights and is then deposited through said exit aperture and said funnel.

18 Claims, 4 Drawing Sheets

MIXING MACHINE FOR PLASTICIZABLE COMPOUNDS

FIELD OF THE INVENTION

The invention relates to a mixing machine for plasticizable compounds through the use of a rotating shaft which has flights thereon. The flights and shaft rotate within a cylindrical housing which encloses the entire assembly. The housing receives base pellets which are plasticizable material in solid form with an additive colorant material which is semi-molten. Both this base pellet material and color additive material are mixed within the mixing machine and deposited into a molding machine for injection molding or like type use.

BACKGROUND OF THE INVENTION

In general, mixing machines are fairly well known. However, given the temperature specifics of the injection molding process and the mixing properties of plasticizable compounds, mixing machines for use in combination with extrusion or injection molding are fairly narrowly defined. U.S. Pat. No. 5, 267,788 teaches a multi-screw continuous mixing and kneading machine with polygonal kneading elements for plasticizable compounds. The multi-screw machine rotates within a housing and encloses the screws which are polygonal in design. However, given the large diameter of the mixing screws and the small volume for flow of the compounds, this design requires an exceedingly high pressure force to turn the mixer. Additionally, this patent is directed particularly at preventing premature melting of the plasticizable compounds and reducing the shear force within the mixing chamber.

Other mixing type machines are also known to mix various plasticizable compounds. These designs include a drive type shaft rotating within a housing and having cylindrical mixing members extending outwardly therefrom. These cylindrical members are utilized to agitate and mix both the base and color material before depositing the compounds into the molding machines.

The problem with the above referenced prior art mixers is that adequate and thorough mixing of the two compounds must be completed prior to depositing the compounds into the molding machine. Otherwise, the material utilized in the molding machines may be only slightly colored or possibly even discolored based upon inadequate mixing. This discoloration may be seen in the form of streaking or a mottled appearance in the final molded product. Additionally, due to the construction of these mixers, cleaning and disassembly is a fairly difficult task. The mixer design of the present invention seeks to overcome these shortcomings.

BRIEF SUMMARY OF THE INVENTION

The foregoing problems may be solved through the use of a new dual flight mixing apparatus as is described herein. The mixer of the present invention is designed to continually mix liquid or solid additives into a base material, the combination of which is then deposited into a molding machine. The base material may be comprised of virgin pellets or regrind (recycled plastic), which is deposited into the mixer continuously. The mixer is a horizontally extending cylindrical chamber which has an entry inlet, the inlet being directly connected to a an entry chute for addition of both base pellet material and the color additive. The entry chute has a dual inlet when coupled with a meter mounting flange through which enter the base and color additive material to be mixed, the base material entering through the topmost entry pathway and the color additive entering through the a side entry via a meter mounting flange noted above. A rotating impeller in the center of the chamber, which provides the mixing action, agitates and thoroughly mixes the material until it is deposited through an outlet at the bottom of the mixing chamber.

The impeller design of the mixer of the present invention is such that complete and thorough mixing of the additives and the base material are completed quickly and easily. The impeller is designed to have two helical flights, one of which is left handed and the other of which is right handed. These flights extend outwardly from the shaft and terminate a short distance from the inside wall of the mixing chamber. Each flight extends about half-way around the shaft. The material to be mixed is thus pulled from the ends of the mixing chamber through the center of the chamber ensuring that a thorough and complete mixing action occurs.

More particularly, the mixing apparatus of the present invention comprises a horizontally aligned mixing chamber with a drive shaft extending centrally therethrough.

Extending outward from the drive shaft are a first and a second helical flight, said first helical flight being right handed and said second helical flight being left handed. Each of said first and said second helical flight extend only partially around said shaft. The rotation of the shaft is preferred such that the material is pulled from the outside walls of the cylindrical housing to the center portion of the mixing chamber. The mixing chamber additionally has a large opening in the bottom specifically designed to both increase mixing of the materials while also allowing the material to flow through readily.

Finally, the present invention is for a mixing machine for plasticizable compounds comprising a cylindrical mixing housing having a removable end wall, an entry inlet directly adjacent to an attached entry chute for depositing of a base plastic material and a liquid or solid additive, a drive motor affixed to the opposite end wall as said removable wall, an impeller extending centrally through said cylindrical mixing housing attached at one end to said motor and at the opposite distal end to a bearing housing, said impeller having a first and a second helical flight extending outward therefrom, said first flight being the midpoint of the impeller to said end wall nearest said motor, said second helical flight being left handed and extending from about midpoint of said impeller and extend to a point just before said removable end wall, said cylindrical housing having a substantial portion of its lower wall removed to create an exit pathway into an exit funnel.

DETAILED DESCRIPTION OF THE PREFERRED EMBODIMENT

Figure 1:
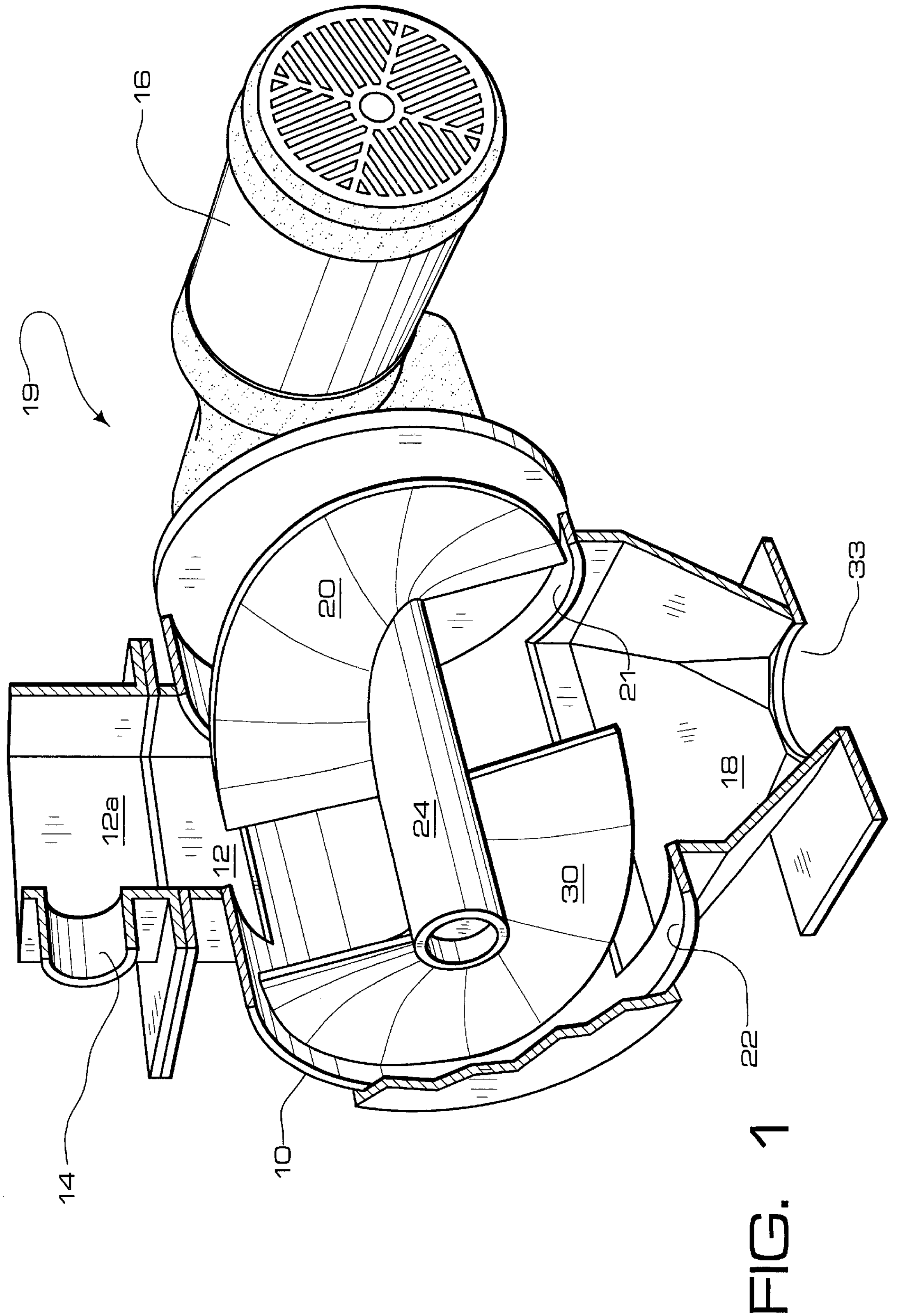
FIG. 1 is a partial cutaway perspective view of the mixing apparatus of the present invention.

The mixing apparatus 19 of the present invention is shown in FIG. 1. The mixing apparatus 19 is comprised of a cylindrical mixing housing 10, an entry inlet 12 and exit passageway 18, and a motor or other drive device 16 which drives the shaft 24. Directly above and adjacent to entry inlet 12 is entry chute 12*a* which accepts the base compound material and the color additive through a first and a second aperture. Drive shaft or impeller 24 extends centrally through the mixing chamber 11. Extending outward from the shaft 24 are a first helical flight 20 and a second helical flight 30. Virgin plastic material enters into the mixing device 19 through the entry chute 12*a* where color material may be added through an additional second entry aperture 14. Base plastic material enters through the first entry aperture at the top of the entry chute 12*a* and is mixed with the addtive antering through second entry aperture 14 which may be a meter mounting flange or other implementation to properly measure the contents of the additive to the base material. The entry chute 12*a* is provided for mixing of the two materials so that they may be placed into the entry inlet 12 of the mixing machine 19. This combined material is mixed within housing 10 in the chamber 11 such that the color additive is thoroughly mixed with the base material before exiting through the exit passageway 18.

Figure 2:
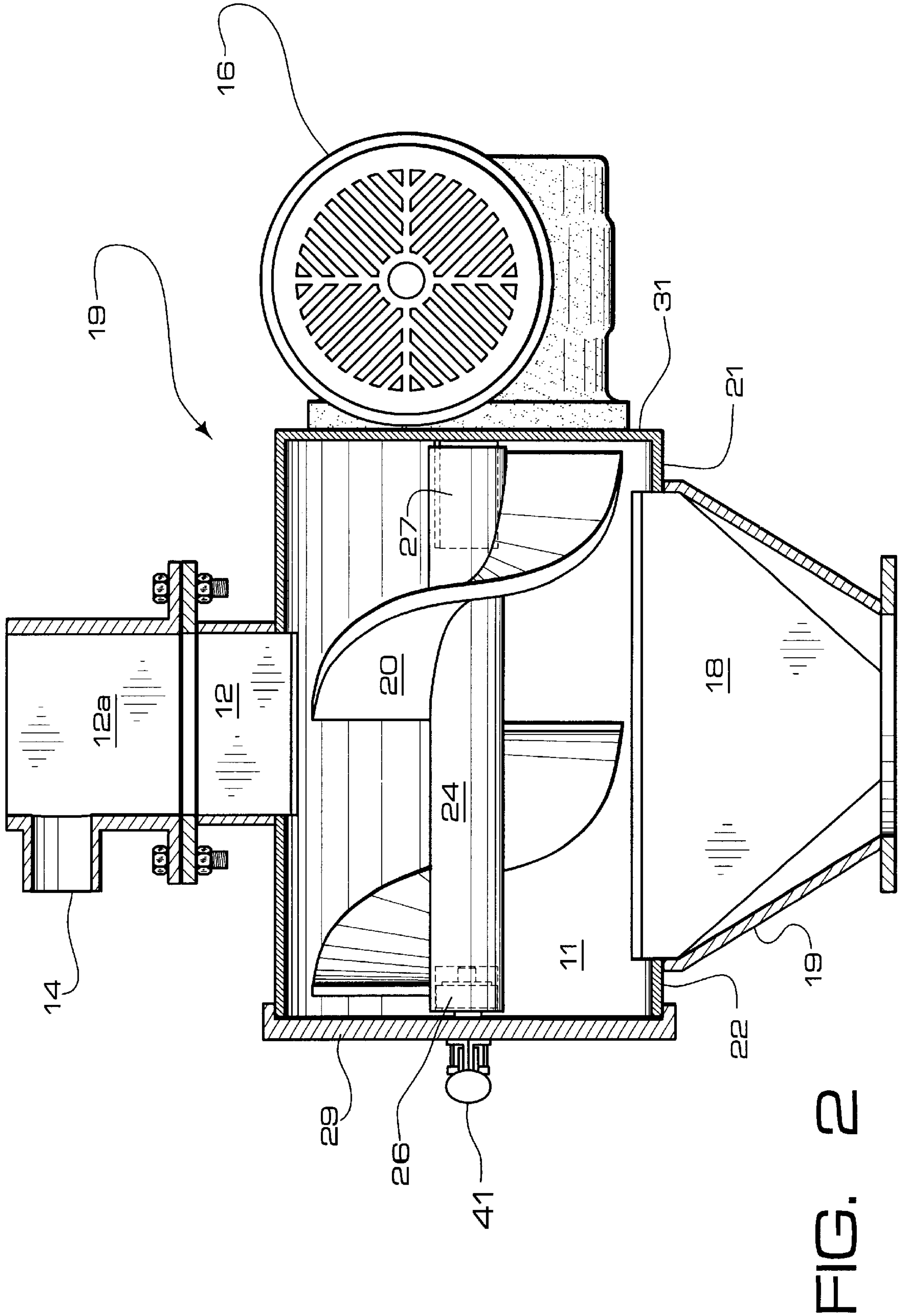
FIG. 2 is a sectional side view of the mixing apparatus of FIG. 1.

The shaft or impeller 24 is supported at one end, as is shown in FIG. 2 in phantom, by a motor shaft 27 which drives the impeller 24. At the opposite distal and of the impeller 24 is located a bearing 26 which allows the cylindrical shaft to rotate freely. Extending outward from the impeller 24 are a first helical flight 20 and a second helical flight 30. First helical flight 20 is a right-hand design while second helical flight 30 is a left hand design. The rotation of the impeller 24 varies between 50 rpms to 200 rpms. The shaft is preferably 1½ inches in diameter.

The motor 16 may drive the impeller 24 in either direction. This may aid the mixing function for particular types of additives but the preferred direction is clockwise to force material through the center of chamber 11. The motor may be between ¾ to 3 HP and has a capacity of from 6 to 20 pounds, depending on the needed characteristics. The impeller 24 is attached to the motor shaft 27 by a key/key way and is removable therefrom. The impeller 24 may be completely removed from the chamber 11 and detached from motor 16 as is shown in FIG. 4.

The mixing machine 19 has a cylindrical housing 10 which has an entry inlet 12 for the base material. Entry inlet 12, as mentioned above, has attached directly adjacent thereto entry chute 12*a*. Entry chute 12*a* is provided as a separate piece of equipment in order to easily feed base and additive material to the entry inlet 12. Entry chute has a first and a second 14 entry aperture for entry of the plasticizable material, said first entry aperture being the topmost aperture and the second entry aperture 14 on the side of the entry chute 12*a*. Of course, multiple other embodiments available to one of ordinary skill in the art may be provided for the task of providing two different materials into a material stream. The base plastic material is typically comprised of virgin pellets or regrind material and enters into the entry chute 12*a* through the topmost aperture. Added to the base material through second entry aperture 14 is a liquid or solid mix color additive which is utilized to dye the base material. The additives may be continuously inserted into the base material or measured prior to addition. The material forms a material stream which then enters into the mixing housing 11 via entry inlet 12.

At one end of the cylindrical housing 10 is a removable end wall 29 which acts as a removable cover for the interior of chamber 11. The removable wall 29 is held into place by toggle clamps 41 and 42 which are shown in FIG. 4. This removable wall allows easy access to the interior of the mixing chamber and to the impeller 24. Once the end wall is removed, the impeller 24 may be pulled outward and removed from the interior mixing chamber 11 of the mixer 19 for cleaning.

Figure 4:
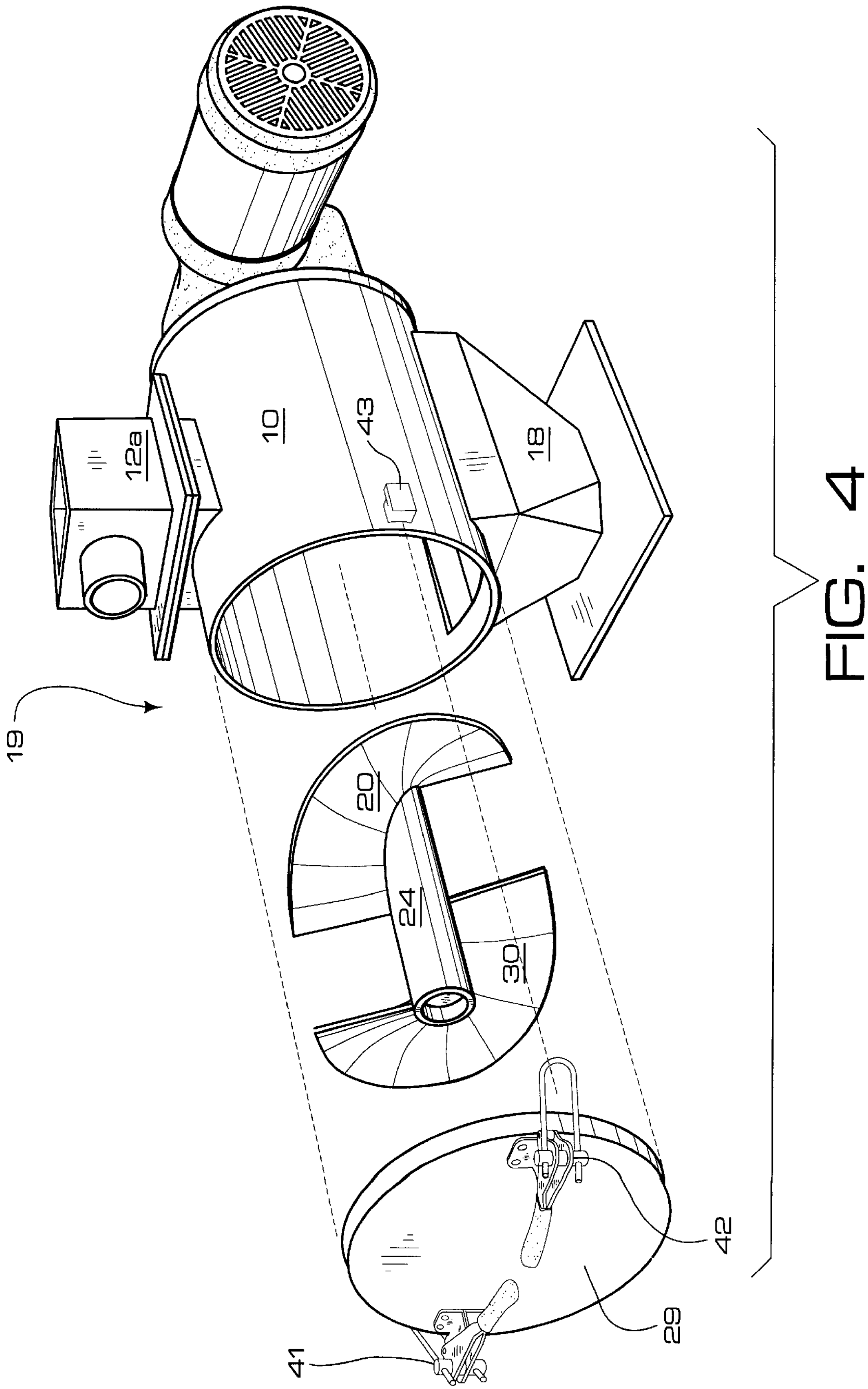
FIG. 4 is a perspective exploded view of the mixing apparatus of FIG. 1.

As is shown in FIG. 4, the end wall 29 is detached from cylindrical housing 10 such that impeller 24 may be removed from the interior of the mixer 19. Additionally, the interior of the housing 10 may be fully accessible for cleaning or other purposes. Toggle clamps 41 and 42 attach to mating holders 43, the opposite one of which is not shown. The end wall 29 is securely attached to the housing 40 to insure proper sealing of the apparatus 19 and cylindrical housing 10. As the contents of the material in the apparatus may be in the solid to semi-molten state, attachment of the end wall must be secure enough to provide a viable seal between the peripheral edge of the wall and the housing 10. The end wall of the cylinder housing 10 is machined flat to create a smooth surface of contact for the removable end wall 29. Likewise, the peripheral edges of the end wall 29 are machined to a smooth flat surface so that, after engagement of the toggle clamps 41 and 42, a complete seal is provided between removable end wall 29 and the exterior edge of the housing 10.

The bottom portion of the cylindrical housing 10 has been substantially removed except for the small end portions 21 and 22 shown in FIG. 2. These bottom wall end portions 21 and 22 are left for the purpose of sealing each end of the chamber and as a point of attachment for the outlet funnel 19. This removed bottom wall of the cylindrical housing 10 allows unrestrictive material flow out of the mixing chamber 11 and promotes ease of cleaning for the mixing apparatus 19. The outlet funnel 19 is attached to the remaining bottom wall portions 22 and 21 such that the exit pathway 18 is formed in order to feed the mixed material to a molding machine. The exit aperture 33 is shown as circular but may be rectangular or square. As is seen in the drawings, the funnel 19 tapers considerably inward from an octagonal opening to a round exit just before the molding machine (not shown) such that the fully mixed material is directed into the opening of a molding machine an in semi-molten, via the additives, and solid state via the base pellets.

The primary mixing function of the mixing apparatus 19 of the present invention results from the helical flights 20 and 30. As previously indicated, each helical flight is oppositely directed in order to force material from the exterior walls to the interior of the mixing chamber 11. First helical flight 20 is closest to the drive motor 16 and extends from the midpoint of the impeller 24 outwardly and to a short distance from cylindrical housing end wall 31. As can be seen in FIG. 2, directly opposite the first helical flight 20 is second helical flight 30 which begins at a similar mid point of impeller 24 and extends in the opposite direction. Second helical flight 30 also ends a short distance from the end wall 29. Each helical flight 20 and 30 extends 180° around the impeller 24 at a pitch that is approximately the same length as the impeller shaft. As can be seen from the drawings, each flight is positioned 180° apart at the opposite ends of the impeller 24. Each flight 20 and 30 is approximately ½ the shaft length. Both the first and second helical flight 20 and 30 act to pull material from the end walls 31 and 29 of the cylindrical housing 10 such that the material passes the entry inlet 12 where the material stream enters into the mixing chamber 11. This mixing in a spiraling motion causes the material to be deposited from one flight behind the opposing flight that is likewise pulling material in the opposite direction at the same time. This folding action of the mixed material over itself causes the base material and the colorized material to be adequately and thoroughly intermixed. This ability to fold over the entire contents of the mixing chamber provides a more thoroughly mixed product in a substantially shorter time frame. Additionally, the material flow within the mixing chamber 11 is fairly unrestricted additionally allowing for further mixing and folding of the material.

As can be seen from the drawings, and particularly FIG. 2, the expected pathway of the material from the entry chute 12*a* through the mixing apparatus 19 is directly vertical such that the combined additive and pelletized material will flow from entry inlet 12 through exit pathway 18. Through use of the impeller 24 and flights 20 and 30, material is folded over itself continuously in the mixing chamber 11 and prevented from directly depositing into the molding machine which is not shown. The total residence time of the material in the mixing chamber can vary substantially depending upon the mold capacity, the cycle time and other requirements of the molding machine and the product being molded. However, this residence time can vary from about 30 seconds to about 5 minutes or more. The material is mixed in a semi-molten state and does not become completely molten until it is in the interior of the molding machine due to the higher melting point of the base pelletized material.

Figure 3:
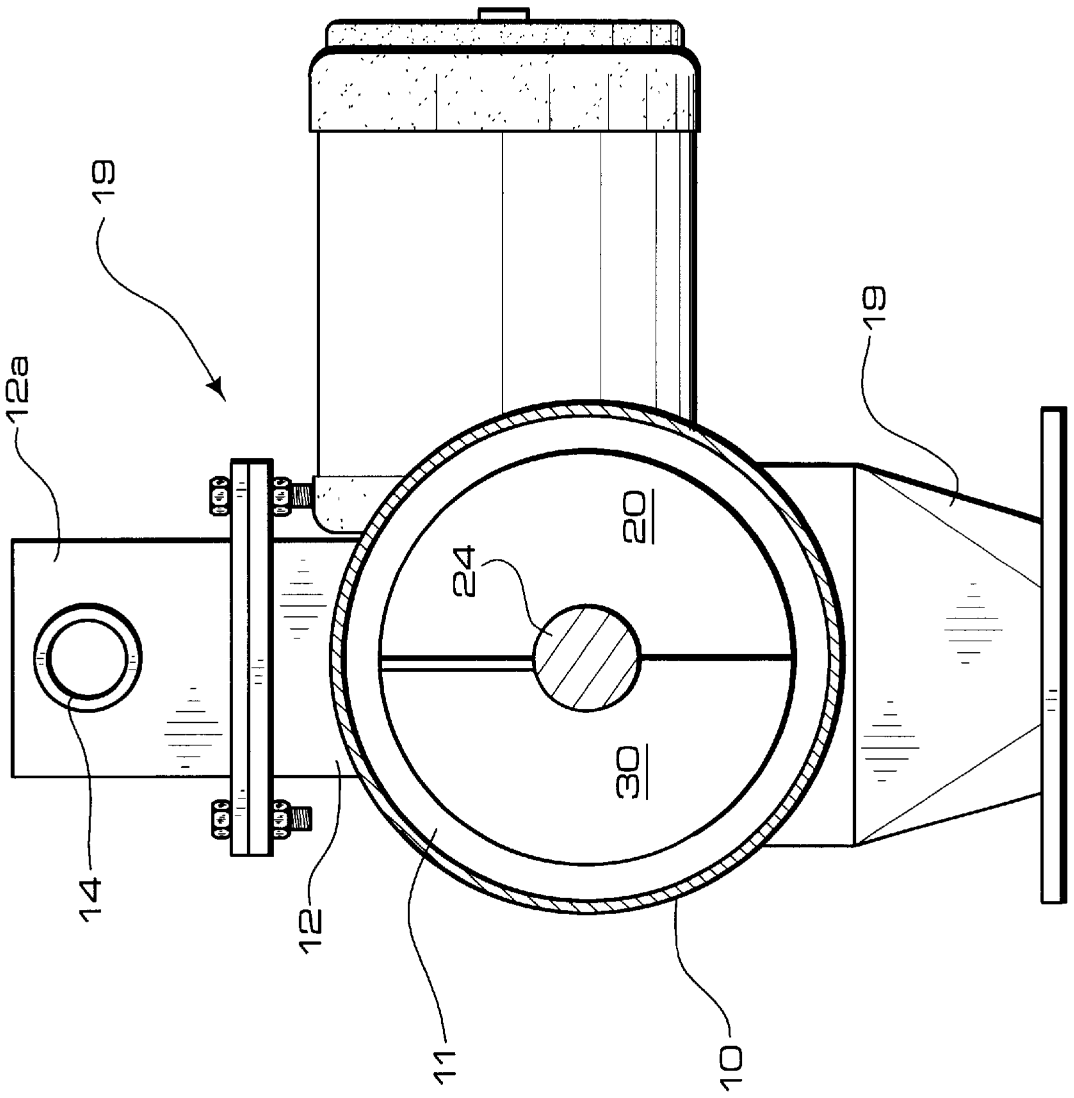
FIG. 3 is a sectional front view of the mixing apparatus of FIG. 1.

As shown in FIG. 3, the opposite handed flights 20 and 30 are seen to encompass a full 360° of the mixing chamber. Impeller 24 acts as the central point of rotation for the helical flights and is also located at the center of the mixing chamber 11. From this view it can be seen that the overall material flow is substantially linear from the entry pathway 12 to the exit pathway 18 while spending time within the mixing chamber 11. The color additives are inserted through second entry aperture 14 of the entry chute 12*a* and may be either liquid or solid, the mixing machine 19 working adequately well with either type of material. The mixing chamber 11 contains high temperature material typically around 350° Fahrenheit or higher. When a solid additive is utilized either granularized pellets or other compounds may be used. The melting point of the mixing additive will be substantially less than the mixing chamber temperature and can be very specific to each individual product. The base material however will melt at a higher temperature within the molding machine and not in the mixing machine. After the material is folded upon itself in the mixing chamber 11, it is deposited through the exit pathway continuously, with respect to the cycle time of the molding machine, into the molding machine for use in the molding process. The total residence time of the mixed material in the mixing chamber 11 is dependent upon the mold capacity and cycle time but can be anywhere from twenty seconds to five minutes.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A mixing machine for continuous mixing of plasticizable compounds, comprising:

a cylindrical mixing housing having a first and a second end wall;

a drive motor;

an impeller extending centrally through said cylindrical mixing housing and attached at a first end to said first end wall and at a second opposite distal end to said second end wall, said impeller being drivingly connected to said drive motor;

a first and second helical flight extending radially outward from said impeller, said first and second flights being in a spaced relationship;

an entry inlet into said cylindrical housing;

an open exit pathway from said cylindrical housing centrally aligned below said entry inlet;

wherein said first helical flight extends from the midpoint of said impeller to said first end and wherein said second helical flight extends from said midpoint of said impeller to said second end.

2. The mixing machine of claim 1 wherein said first helical flight is a right handed flight and said second helical flight is a left handed flight.

3. The mixing machine of claim 1 wherein said first and said second flight extend 180 degrees around said impeller.

4. The mixing machine of claim 1 wherein said first helical flight and said second helical flight are positioned 180 degrees apart at said midpoint of said impeller.

5. The mixing machine of claim 1 wherein said first helical flight extends from said midpoint of said impeller and extends around said impeller approximately 180 degrees in a right-handed direction and said second helical flight extends from the opposite side of said midpoint of said impeller and extends around said impeller approximately 180 degrees in a left-handed direction.

6. The mixing machine of claim 5 wherein said first helical flight extends substantially to said first end wall of said cylindrical housing and said second helical flight extends substantially to said second end wall.

7. The mixing machine of claim 5 wherein the pitch of said first and said second helical flight is substantially equal to the length of said impeller.

8. The mixing machine of claim 1 wherein said impeller is attached at said second distal end to a bearing housing.

9. The mixing machine of claim 1 wherein said impeller rotates at between 50 and 200 rotations per minute.

10. The mixing machine of claim 1 wherein said mixing machine is further comprised of an entry chute attached to said cylindrical housing adjacent to said entry inlet, said entry chute having a first entry aperture and a second entry aperture.

11. The mixing machine of claim 1 wherein said exit pathway is comprised of an outlet funnel, said funnel tapering inwardly from a point closest to said cylindrical mixing housing, where said funnel is rectangular, to a circular exit aperture at said outlet funnel.

12. A mixing machine for continuous mixing of plasticizable compounds, comprising:

a cylindrical mixing housing having a first and a second end wall and an inner wall;

a drive motor;

an impeller extending centrally through said cylindrical mixing housing and attached at a first end to said first end wall and at a second opposite distal end to said second end wall, said impeller being drivingly connected to said drive motor;

a first and second helical flight extending radially outward from said impeller, said first and second flights being in a spaced relationship;

an entry inlet into said cylindrical housing;

an entry chute attached to said cylindrical mixing housing over said entry inlet, said entry chute having a first entry aperture and a second entry aperture;

an open exit pathway from said cylindrical housing centrally aligned below said entry inlet;

wherein said first helical flight extends from the midpoint of said impeller to said first end and wherein said second helical flight extends from said midpoint of said impeller to said second end.

13. The mixing machine of claim 12, said first and second helical flights extending radially outward substantially to said inner wall of said cylindrical mixing housing, said first and second helical flights being offset 180 degrees at the midpoint of said impeller shaft, said first and second helical flights each having a pitch opposite in direction to the pitch of the other and between one-half and two times the length of said impeller shaft.

14. The mixing machine of claim 12, said first and second helical flights extending radially outward substantially to said inner wall of said cylindrical mixing housing, said first and second helical flights being offset 180 degrees at the midpoint of said impeller shaft, and said first and second helical flights each having a pitch opposite in direction to the pitch of the other and substantially equal to the length of said impeller shaft.

15. A mixing machine for continuous mixing of plasticizable compounds, comprising:

a cylindrical mixing housing having a top side, a bottom side, an inner wall and a first and a second end wall;

an impeller shaft having a midpoint and first and second distal ends, said shaft extending centrally through said cylindrical mixing housing and being rotatably attached to said first and second end walls, said impeller shaft being drivingly connected to a motor;

a first helical flight extending radially outward from said impeller shaft substantially to said inner wall of said cylindrical mixing housing and around said impeller shaft from said first end to said midpoint, said first helical flight having a pitch between one-half and two times the length of the impeller shaft;

a second helical flight extending radially outward from said impeller shaft substantially to said inner wall of said cylindrical mixing housing and around said impeller shaft offset 180 degrees from the point where said first helical flight terminates at said midpoint of said impeller shaft, said second helical flight extending to said second end, said second helical flight having a pitch opposite in direction to the pitch of said first helical flight and between one-half and two times the length of the impeller shaft;

an entry inlet centrally positioned on said top side of said cylindrical mixing housing; and an open exit outlet centrally positioned on said bottom side of said cylindrical mixing housing below said entry outlet.

16. The mixing machine of claim 15, wherein said first end wall is removable.

17. The mixing machine of claim 15 further comprising an entry chute attached to said cylindrical mixing housing over said entry inlet, said entry chute having a first entry aperture and a second entry aperture.

18. The mixing machine of claim 15 further comprising an outlet funnel attached to said cylindrical mixing housing under said exit outlet, said outlet funnel tapering inwardly from a point closest to said cylindrical mixing housing, said funnel being rectangular, and said outlet funnel having a circular exit aperture.

* * * * *